(12) United States Patent
Ganti et al.

(10) Patent No.: US 11,018,753 B2
(45) Date of Patent: May 25, 2021

(54) METHOD AND SYSTEM FOR CANCELLING SELF-INTERFERENCE BY A NODE IN A WIRELESS COMMUNICATION SYSTEM

(71) Applicant: Indian institute of Technology Madras (IIT Madras), Chennai (IN)

(72) Inventors: Radhakrishna Ganti, Chennai (IN); Arjun Nadh, Chennai (TN)

(73) Assignee: INDIAN INSTITUTE OF TECHNOLOGY MADRAS, Chennai (IN)

( * ) Notice: Subject to any disclaimer, the term of this patent is extended or adjusted under 35 U.S.C. 154(b) by 0 days.

(21) Appl. No.: 16/492,116

(22) PCT Filed: Feb. 26, 2018

(86) PCT No.: PCT/IN2018/050101
§ 371 (c)(1),
(2) Date: Sep. 7, 2019

(87) PCT Pub. No.: WO2018/163196
PCT Pub. Date: Sep. 13, 2018

(65) Prior Publication Data
US 2020/0106517 A1 Apr. 2, 2020

(30) Foreign Application Priority Data

Mar. 7, 2017 (IN) .............................. 201741007911

(51) Int. Cl.
*H04B 7/155* (2006.01)
*H04B 1/525* (2015.01)
*H04L 5/14* (2006.01)
*H04L 25/02* (2006.01)

(52) U.S. Cl.
CPC ......... *H04B 7/15585* (2013.01); *H04B 1/525* (2013.01); *H04L 5/14* (2013.01); *H04L 25/0208* (2013.01)

(58) Field of Classification Search
CPC ................ H04B 7/15585; H04B 1/525; H04B 7/15564; H04L 5/14; H04L 25/0208; H04L 5/0048
See application file for complete search history.

(56) References Cited

U.S. PATENT DOCUMENTS

| 9,923,705 B2 * | 3/2018 | Mishra | H04L 5/14 |
| 2008/0317150 A1 * | 12/2008 | Alexander | H04L 27/2657 375/260 |
| 2013/0089021 A1 * | 4/2013 | Gaal | H04B 7/155 370/315 |

* cited by examiner

*Primary Examiner* — Dady Chery (57) ABSTRACT

Embodiments herein provide a method for decoding received signal by node in wireless communication system. The method includes receiving a signal from a first User Equipment (UE), where the received signal comprises a set of preambles in which each preamble is identical to an at least one preamble in a preamble structure and obtaining a composite signal comprising a self-interference signal, where the self-interference signal is known at the node. Further, the method includes determining self-interference channel estimate using the composite signal and decoding the received signal by eliminating the self-interference signal from the received signal based on the self-interference channel estimate.

6 Claims, 6 Drawing Sheets

METHOD AND SYSTEM FOR CANCELLING SELF-INTERFERENCE BY A NODE IN A WIRELESS COMMUNICATION SYSTEM

FIELD OF INVENTION

The embodiments herein relate to wireless communication. More particularly, relates to a method and system for decoding a received signal by a node in a wireless communication system. The present application is a National Phase Application for PCT application No. PCT/IN2018/050101 which is based on, and claims priority to Indian Application Number 201741007911 filed on 7 Mar. 2017, the disclosure of which is hereby incorporated by reference.

BACKGROUND OF THE INVENTION

In general, wireless communication system components like a node supports in-band full-duplex communication mode. The in-band full-duplex communication mode includes the node transmitting and receiving signals from a plurality of user equipments (UEs) simultaneously. However, the challenge in achieving in-band full-duplex communication is to effectively decode a signal received by the node in the presence of a self-interference created by a signal transmitted by the node.

Existing self-interference suppression techniques in the in-band full-duplex communication mode provide self-interference suppression which limits the application of in-band full-duplex communication mode in wireless communication systems. Also, eliminating the self-interference requires accurate estimation of the self-interference channel and cancelling of the self-interference accordingly.

The above information is presented as background information only to help the reader to understand the present invention. Applicants have made no determination and make no assertion as to whether any of the above might be applicable as prior art with regard to the present application.

OBJECT OF INVENTION

The principal object of the embodiments herein is to provide a method and system for decoding a received signal by a node in a wireless communication system.

Another object of the embodiments herein is to provide a received signal which includes a set of preambles where each preamble is identical to an at least one preamble in a preamble structure.

Another object of the embodiments herein is to utilize the identical preambles in the preamble structure to eliminate the received signal in a self-interference channel estimate.

Another object of the embodiments herein is to determine a self-interference channel estimate.

Another object of the embodiments herein is to decode the received signal by eliminating the self-interference signal from the received signal.

Another object of the embodiments herein is to use the self-interference channel estimate to eliminate the self-interference signal from the received signal.

Another object of the embodiments herein is to use a filter which is adaptive to determine the self-interference channel estimate.

Another object of the embodiments herein is to provide a method to estimate the self-interference channel in digital, analog and RF domain.

SUMMARY

Accordingly, the embodiments herein provide a method for decoding received signal by node in wireless communication system. The method includes receiving a signal from a first User Equipment (UE), where the received signal comprises a set of preambles in which each preamble is identical to an at least one preamble in a preamble structure and obtaining a composite signal comprising a self-interference signal, where the self-interference signal is known at the node. Further, the method includes determining self-interference channel estimate using the composite signal and decoding the received signal by eliminating the self-interference signal from the received signal based on the self-interference channel estimate.

Accordingly, the embodiments herein provide a node for decoding a received signal in a wireless communication system. The node includes a processor, a memory coupled to the processor and a transceiver coupled to the processor and the memory. The transceiver is configured to receive a signal from a first User Equipment (UE), where the received signal comprises a set of preambles in which each preamble is identical to an at least one preamble in a preamble structure and obtain a composite signal comprising a self-interference signal, wherein the self-interference signal is known at the node. Further, the transceiver is configured to determine self-interference channel estimates using the composite signal and decode the received signal by eliminating the self-interference signal from the received signal, based on the self-interference channel estimate.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The term "first" and "second" herein are used merely for labeling purpose and can be used interchangeably without departing from the scope of the embodiments.

The term "node" as used in the description includes any device or equipment that supports in-band full-duplex wireless communication such as for example a base station (BS), a user equipment (UE), a Wi-Fi access point, a transceiver or the like.

Accordingly, the embodiments herein provide a method for decoding received signal by node in wireless communication system. The method includes receiving a signal from a first User Equipment (UE), where the received signal comprises a set of preambles in which each preamble is identical to an at least one preamble in a preamble structure and obtaining a composite signal comprising a self-interference signal, where the self-interference signal is known at the node. Further, the method includes determining self-interference channel estimate using the composite signal and decoding the received signal by eliminating the self-interference signal from the received signal based on the self-interference channel estimate.

In an embodiment, the self-interference estimate is determined by finding the difference between identical preambles in the composite signal and using the resulting difference samples.

In an embodiment, the self-interference estimate is determined using an adaptive filter. Examples of adaptive filter include Least Mean Square filter, Recursive Least Squares filter etc.

In the conventional in-band full-duplex wireless communication methods and systems, in-band full-duplex two ways simultaneous communications does not work because of the self-interference experienced by the node due to simultaneous reception and transmission. Further, the self interference degrades the decoding of the received signal at the node.

In the conventional methods and systems, the transmitted signal is used in conjunction with the self-interference signal to generate a copy of the self-interference signal, which is subtracted at the receiver to suppress the self-interference. signal/noise.

Unlike to the conventional methods and systems, the proposed method includes using the set of symmetrically identical preambles in the received signal to eliminate the received signal component in the composite signal. Further, the composite signal is used to determine the self-interference channel estimates.

Unlike to the conventional methods and systems, the proposed method uses the self-interference channel estimates to eliminate the self-interference signal from the received signal while decoding the received signal.

Unlike to the conventional methods and systems, the proposed method eliminates the received signal component from the composite signal and determines the self-interference channel estimates, which ensures better channel estimation. Further, the self-interference channel estimates are used to eliminate the self-interference channel while decoding the received signal.

Unlike to the conventional methods and systems, in the proposed method the self-interference channel estimation is performed based on the composite signal, which either does not have the received signal component or has a significantly reduced component of the received signal.

Referring now to the drawings, and more particularly to FIGS. 1 through 7, where similar reference characters denote corresponding features consistently throughout the figures, there are shown preferred embodiments.

Figure 1:
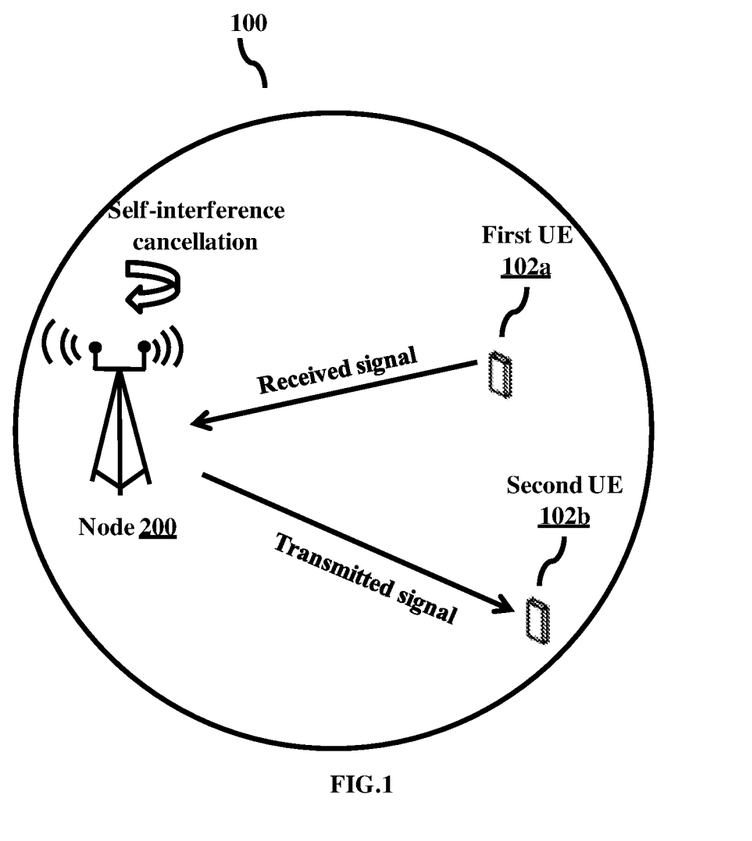
FIG. 1 illustrates an in-band full-duplex wireless communication system with node and a plurality of UEs for self-interference cancellation at the node, according to the embodiments as disclosed herein.

FIG. 1 illustrates an in-band full-duplex wireless communication system 100 with node 200 and a plurality of UEs for self-interference cancellation at the node 200, according to the embodiments as disclosed herein.

In the in-band full-duplex wireless communication system 100, same frequency spectrum is used for both transmitting and receiving the signals simultaneously by the node 200 i.e., the node 200 can transmit the communication signals to the plurality of UEs (e.g., a first UE 102a and a second UE 102b) and receive the communication signals from the plurality of UEs (i.e., the first UE 102a and the second UE 102b) at the same time, in the same frequency spectrum. However, the possibility of using the same frequency spectrum for simultaneous transmission and reception requires that interference problems to be addressed accordingly. The primary type of interference that may be created when allowing the same frequency spectrum to be used for both transmitting and receiving the signals is the self interference where the node transmitter creates interference to its own receiver. Further, the suppression and generation of the self-interference signal may be performed partly in analog and partly in digital domain. Also, since the self-interference channel varies with the ambient environment, periodic estimation of the self-interference channel is crucial to suppressing the self-interference. Further, a desirable channel estimation method is the one which can estimate the self-interference channel efficiently in the presence of the received signal so as to avoid excess overhead.

Referring to the FIG. 1, an exemplary in-band full-duplex wireless communication system 100 includes the node 200 and UEs i.e., the first UE 102a and the second UE 102b. The node 200 receives the signal from the first UE 102a and transmits a signal to the second UE 102b. However, when the node 200 receives an incoming signal from the first UE 102a, the node 200 also simultaneously indulges in the transmission of an outgoing signal to the second UE 102b. The transmitted signal to the second UE 102b creates self-interference to the processing of the received signal from the first UE 102a at the node 200. For the node 200 to be able to effectively decode the incoming signal from the first UE 102a, the self-interference has to be suppressed.

The proposed method and system provides for a self interference cancellation technique. The signal transmitted by the first UE 102a is provided with a set of preambles. The set of preambles appear in pairs, wherein each preamble is identical to another preamble in the preamble pair and hence are symmetric. The symmetric preamble structure is used to eliminate the received signal components completely from the self-interference channel estimates, which are further used to decode the received signal. Further, the preamble may refer to any pair of identical IQ sample sequences where the IQ sample sequences might be separated in time. Further, the location and length of the sequences should be known at the node. For example, the sequences can include cyclic prefix in OFDM systems like LTE, 5G new radios, Wi-Fi (802. 11), xxxxxx preamble in a Wi-Fi system and the like.

At the node 200, the composite signal obtained includes the received signal (i.e., the signal received from the first UE 102a) and the self-interference signal (i.e. the signal transmitted by the node 200 to the second UE 102b). Further, the composite signal is used to obtain the self-interference channel estimates. The self-interference channel estimates are used to eliminate the self interference in the received signal while decoding the received signal.

Figure 2A:
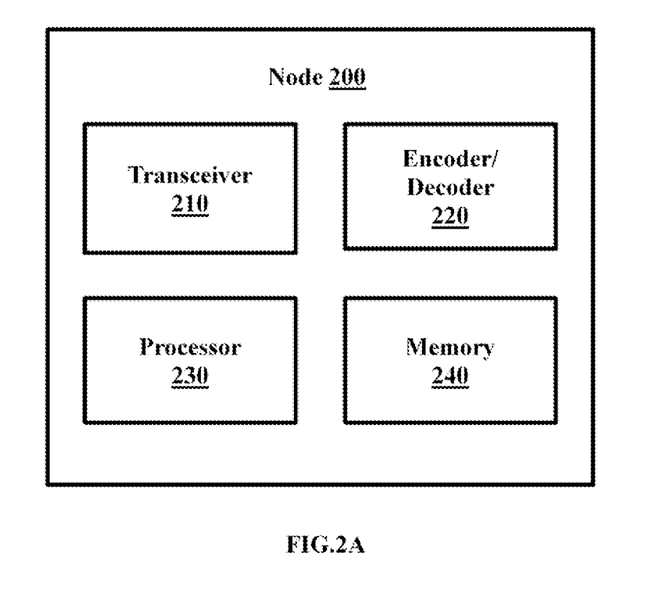
FIG. 2A is a block diagram illustrating various elements of the node, according to the embodiments as disclosed herein.

FIG. 2A is a block diagram illustrating various elements of the node200, according to the embodiments as disclosed herein.

Referring to the FIG. 2A, the node 200 may include a transceiver 210, an encoder/decoder 220, a processor 230 and a memory 240.

In an embodiment, the transceiver 210 can be configured to receive the signal sent to the node 200 by the first UE 102a. The received signal includes the encoded data along with the symmetric preamble structure 310. The symmetric preamble structure 310 includes a set of preambles (i.e., any pair of identical IQ sample sequences) which appear in preamble pairs. Further, each preamble in the preamble pair is symmetrically identical to successive preamble. Furthermore, the preamble structure is explained in FIG. 3A in the later parts of the description.

Further, the transceiver 210 can be configured to transmit the signal from the node 200 to the second UE 102b. The transceiver 210 of the node 200 simultaneously transmits to the UE and receives the signals from the UE.

In an embodiment, the encoder/decoder 220 can be configured to encode the data to be transmitted to the second UE 102b. The encoder/decoder 220 can also be configured to decode the signal received from the first UE 102a to extract the data from the received signal.

In an embodiment, the processor 230 can be configured to interact with the hardware elements such as the transceiver 210, the encoder/decoder 220 and the memory 240 in the node 200 to execute one or more instructions for cancelling the self interference and to decode the received signal at the node 200.

In an embodiment, the memory 240 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 240 may, in some examples, be considered a non-transitory storage medium. The term "non-transitory" may indicate that the storage medium is not embodied in a carrier wave or a propagated signal. However, the term "non-transitory" should not be interpreted that the memory 240 is non-movable. In some examples, the memory 240 can be configured to store larger amounts of information than the memory. In certain examples, a non-transitory storage medium may store data that can, over time, change (e.g., in Random Access Memory (RAM) or cache).

Figure 2B:
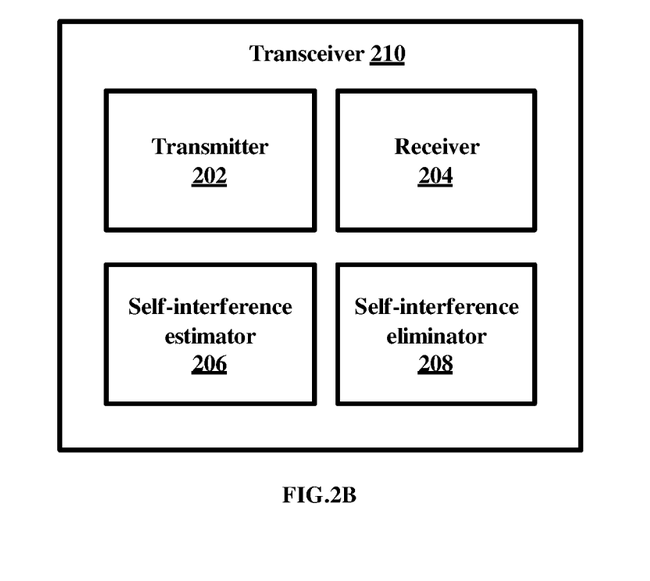
FIG. 2B is a block diagram illustrating various elements of a transceiver of the node, according to the embodiments as disclosed herein.

FIG. 2B is a block diagram illustrating various elements of a transceiver 210 of the node 200, according to the embodiments as disclosed herein.

Referring to the FIG. 2B, the transceiver 210 can include a transmitter 202, a receiver 204, a self-interference estimator206 and a self-interference eliminator 208.

In an embodiment, the transmitter 202 can be configured to transmit the signal to a plurality of UEs from the node 200. The transmitter 202 may also include a digital-to-analog convertor (DAC) which converts the digital signal to an analog signal before transmission. Further, an up-converter may convert the analog signal to a high frequency band RF signal followed by a power amplifier which may amplify the high frequency band RF signal to be transmittable.

In an embodiment, the receiver 204 can be configured to receive the signals from a plurality of UEs. The receiver 204 may also include an analog-to-digital convertor (ADC) which converts the received analog signal to a digital signal before processing. A down-converter may convert the high frequency band RF signal to a baseband signal.

In an embodiment, the self-interference estimator206 can be configured to determine the self-interference channel estimate. The self-interference estimator206 obtains a composite signal. The composite signal is obtained when the received signal and the self-interference signal (i.e., the transmitted signal) are added up over the air. The self-interference signal is the signal transmitted by the node 200 to the second UE 102b and the self-interference signal is known at the node 200. Further, the self-interference estimator 206 may include an adaptive filter which uses the known transmitted signal and determines the self-interference channel estimate by computing the difference between consecutive pairs of composite signal components. In an example, the adaptive filter can be one of least mean square filter, recursive least squares filter, etc. The adaptive filters continuously changing the estimated channel coefficient by tracking the channel coefficients estimated from SH-SI2 and or SI3-S14. The self-interference channel estimate obtained will either not have any component of the received signal or will have a significantly reduced component of the received signal. The absence of any component of the received signal in the self-interference channel estimate provides better channel estimation. Further, the number of components of the composite signal required for channel estimation is not dependent on the strength of the received signal.

In an embodiment, the self-interference eliminator 208 can be configured to use the self-interference channel estimate to cancel out the self-interference signal in the received signal.

Figure 3A:
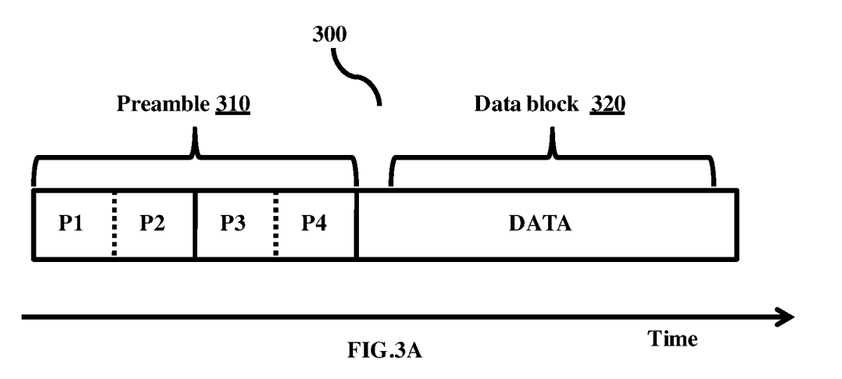
FIG. 3A illustrates a time domain packet structure of the signal received by the node 200 comprising a set of preambles, according to the embodiments as disclosed herein.

FIG. 3A illustrates a time domain packet structure of the signal received by the node 200 comprising a set of preambles, according to the embodiments as disclosed herein.

Referring to the FIG. 3A, the time domain packet structure includes a set of preambles. Each preamble is identical to another preamble (i.e., the one of the preambles) in a preamble pair of the time domain packet structure. Further, the preamble may refer to any pair of identical IQ sample sequences where the IQ sample sequences might be separated in time. Furthermore, the location and length of the sequences should be known at the node 200. For example, the sequences can include cyclic prefix in OFDM systems like LTE, 5G new radios, Wi-Fi (802. 11), xxxxxx preamble in a Wi-Fi system and the like.

The preamble includes the preamble pairs for example, P1, P2, P3, P4, P5, P6, P7 and P8 where the a set of preamble pair are identical i.e., P1 is identical to P2, P3 is identical to P6, P5 is identical to P8 and P7 is identical to P4. In an embodiment, the set of preambles appear in preamble pairs and each preamble in the pair is identical to at least one other preamble in the preamble structure. The identical preambles of the preamble structure enable cancellation of the received signal while determining the self-interference channel estimates. Further, each preamble is a complex number with a specific value accorded to each preamble.

The time domain packet structure 300 of the signal received by the node 200 includes a preamble 310 and a data block 320. The preamble 310 includes sequential preamble pairs within which individual preambles are identical to at least one other preamble in the preamble structure. The data block 320 includes the data to be transmitted by the first UE 102a to the node 200. The preamble 310 is used by the node 200 to extract the data from the data block 320 of the time domain packet structure 300 of the signal received by the node 200.

Figure 3B:
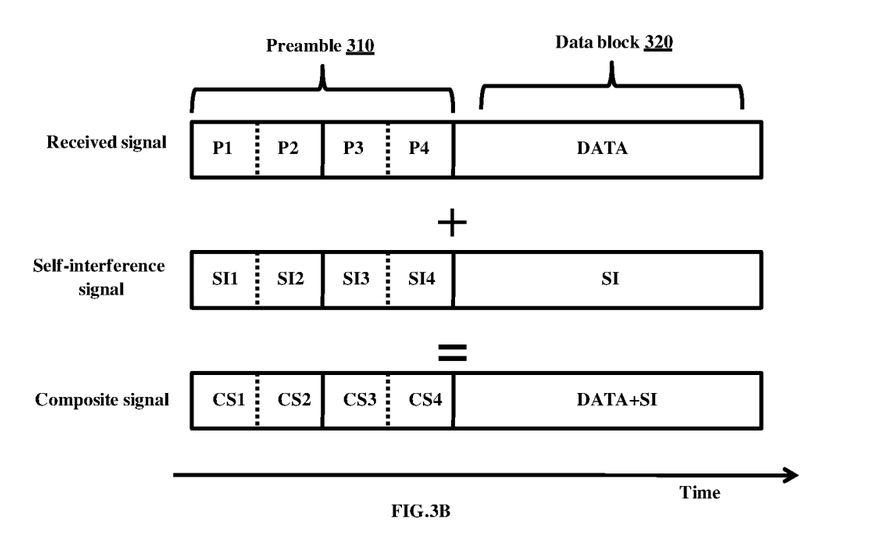
FIG. 3B illustrates a process of obtaining a composite signal using a received signal and a self-interference signal over air, according to the embodiments as disclosed herein.

FIG. 3B illustrates a process of obtaining the composite signal using the received signal and the self-interference signal over air, according to the embodiments as disclosed herein.

Referring to the FIG. 3B, the composite signal is obtained by adding the received signal to the self-interference signal. The received signal includes the data along with the preamble 310. In an example consider that the preamble includes the preamble pairs for example, P1, P2, P3, P4, P5, P6, P7 and P8 where the consecutive preamble pairs are identical i.e., P1 is identical to P2, P3 is identical to P4, P5 is identical to P6 and P7 is identical to P8. In another example consider that the a preamble in the preamble pair is identical to one another preamble in the preamble structure i.e., P1 is identical to P2, P3 is identical to P6, P5 is identical to P8 and P7 is identical to P4.

The self-interference signal is denoted as SI in the time domain packet structure. SI1, SI2, SI3 and SI4 correspond to the SI packet during P1, P2, P3 and P4 respectively.

CS1, CS2, CS3, CS4 denotes the composite signal that is obtained at the transceiver 210 of the node 200. Therefore the value of CS1, CS2, CS3 and CS4 are computed as follows:

$$CS1 = P1 + SI1,$$

$$CS2 = P2 + SI2,$$

$$CS3 = P3 + SI3, \text{ and}$$

$$CS4 = P4 + SI4.$$

Figure 4:
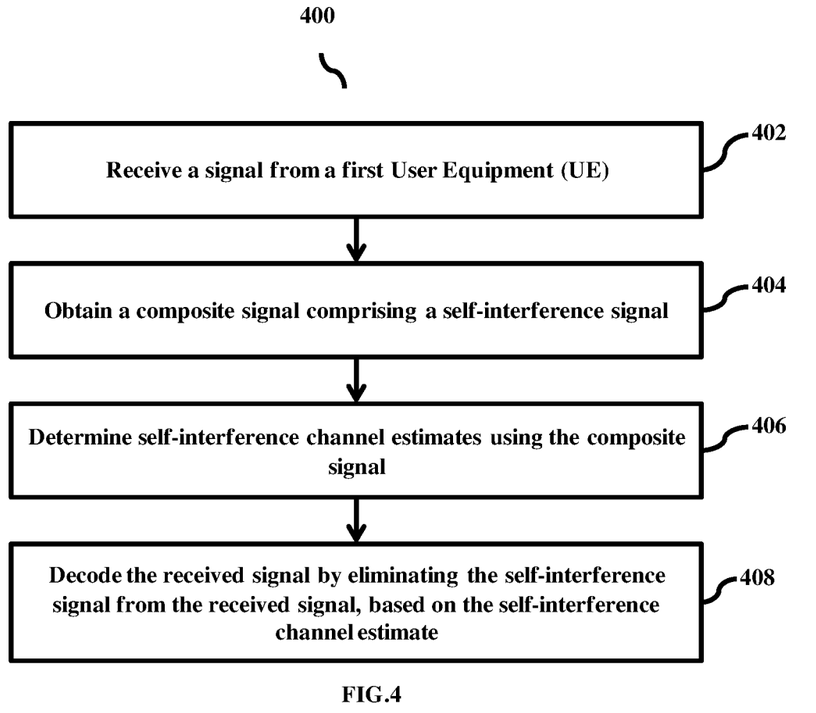
FIG. 4 is a flowchart illustrating a method for decoding the received signal by the node in the in-band full-duplex wireless communication system, according to the embodiments as disclosed herein.

FIG. 4 is a flowchart 400 illustrating a method for decoding the received signal by the node 200 in the in-band full-duplex wireless communication system, according to the embodiments as disclosed herein.

Referring to the FIG. 4, at step 402, the method includes receiving the signal from the first UE 102a. The received signal includes a set of preambles in which each preamble is identical to the at least one preamble in the preamble structure.

At step 404, the method includes obtaining the composite signal including the self-interference signal. The self-interference signal is known at the node as the self-interference is caused by the signal transmitted by the node 200 to the second UE 102b.

At step 406, the method includes determining the self-interference channel estimates using the composite signal. The self interference channel estimates are obtained by determining the difference between consecutive pairs of composite signal components in the composite signal. Further, the received signal is eliminated from the composite signal.

At step 408, the method includes decoding the received signal by eliminating the self-interference signal from the received signal. The elimination of the self-interference signal is based on the self-interference channel estimate. The self-interference channel estimates are used to eliminate the self-interference signal which interferes with the decoding of the received signal. Hence, a better quality of the received signal is obtained and the data decoded accordingly.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
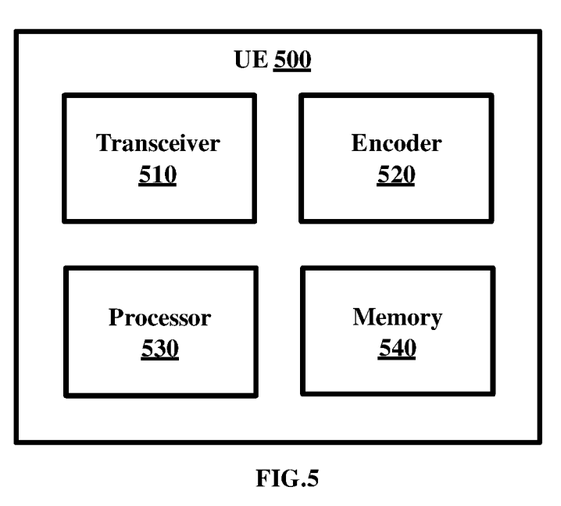
FIG. 5 is a block diagram illustrating various elements of a user equipment (UE), according to the embodiments as disclosed herein.

FIG. 5 is a block diagram illustrating various elements of the UE 500, according to the embodiments as disclosed herein.

Referring to the FIG. 5, the UE 500 can include a transceiver 510, an encoder/decoder 520, a processor 530 and a memory 540.

In an embodiment, the transceiver 510 may be configured to transmit the signal to the node 200. The signal to be transmitted includes the encoded data along with a preamble structure 310. The transceiver 510 can also be configured to receive the signal sent by the node 200.

In an embodiment, the encoder 520 can be configured to provide the preamble structure 310 to the signal to be transmitted to the node 200. The preamble structure 310 includes a set of preambles in which each preamble is identical to the at least one preamble in the preamble structure. Further, the preamble 310 is used for self-interference cancellation by the node 200.

In an embodiment, the processor 530 can be configured to interact with the hardware elements such as the transceiver 510, the encoder 520 and the memory 540 in the UE 500 to provide symmetric preamble structure 310 to the signal to be transmitted to the node 200.

In an embodiment, the memory 540 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 540 may, in some examples, be considered a non-transitory storage medium. The term "non-transitory" may indicate that the storage medium is not embodied in a carrier wave or a propagated signal. However, the term "non-transitory" should not be interpreted that the memory 540 is non-movable. In some examples, the memory 540 can be configured to store larger amounts of information than the memory. In certain examples, a non-transitory storage medium may store data that can, over time, change (e.g., in Random Access Memory (RAM) or cache).

Figure 6:
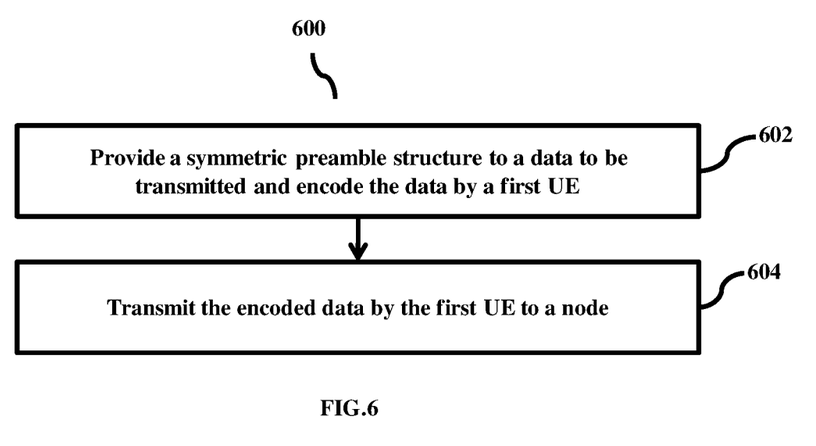
FIG. 6 is a flowchart illustrating a method transmitting a signal by the UE in the in-band full-duplex wireless communication system, according to the embodiments as disclosed herein.

FIG. 6 is a flowchart 600 illustrating a method of transmitting the signal by the UE 500 in the in-band full-duplex wireless communication system, according to the embodiments as disclosed herein.

Referring to the FIG. 6, at step 602, the method includes providing the preamble structure to the signal to be transmitted and encode the data by the first UE 102a. The signal to be transmitted includes a set of preambles. Further, each preamble is identical to the at least one preamble in the preamble structure.

At step 604, the method includes transmitting the encoded data by the first UE 102a to the node. The first UE 102a sends the signal to be transmitted to the node through the RF channel The signal to be transmitted can be a RF analog signal or a baseband digital signal.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 7:
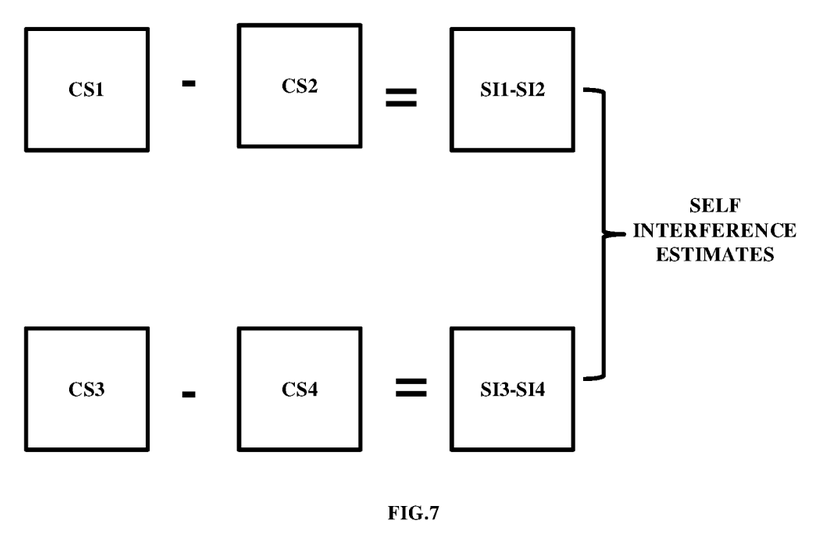
FIG. 7 is an illustration of self-interference channel estimate, according to the embodiments as disclosed herein.

FIG. 7 is an illustration of the self-interference channel estimate, according to the embodiments as disclosed herein.

Referring to the FIG. 7, the self-interference channel estimates are obtained by determining the difference between consecutive pairs in the composite signal which eliminates the received signal. The adaptive filter is used to determine the self-interference channel estimates.

The adaptive filter employs active noise control (ANC), also known as noise cancellation or active noise reduction (ANR) to cancel the self interference signal for decoding the received signal. The ANC is a method for reducing a noise signal by the addition of a second signal specifically designed to cancel the noise signal. In the proposed method the noise signal is the self-interference signal and the second signal specifically designed to cancel the noise signal is the received signal which has the preamble 310 specifically to cancel the self-interference signal.

Further, the self-interference channel estimates is determined as follows:

$CS1=P1+SI1$ and $CS2=P2+SI2$

Further, intermediate values are computed which are then used to determine the self-interference channel estimates.

Intermediate value $1=CS1-CS2$ $=P1+SI1-(P2+SI2)$ $=(P1-P2)+(SI1-SI2)$

Intermediate value $1=SI1-SI2$, for two preambles being equal i.e., $P1=P2$ and $P1-P2=0$ Intermediate value $2=CS3-CS8$ $=P3+SI3-(P8+SI8)$ $=(P3-P8)+(SI3-SI8)$ Intermediate value $2=SI3-SI8$, for $P3=P8$ and $P3-P8=0$ in an exemplary preamble structure P1XXXXXXP8. Therefore, the intermediate values computed are used to determine the self-interference channel estimate which has only the self-interference channel components as the received signal components are cancelled out. The elimination of the received signal components from the composite signal provides better channel estimates. It should be noted that the number of samples required for channel estimation is not dependent on the received signal strength.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for decoding a received signal by a node in a wireless communication system, the method comprising:
   receiving, by the node, a signal from a first User Equipment (UE), wherein the received signal includes the encoded data and a symmetric preamble structure, wherein the symmetric preamble structure comprises a set of preambles, wherein in each preamble is identical to at least one preamble in the symmetric preamble structure;
   obtaining, a composite signal comprising a self-interference signal and the received signal, wherein composite signal is obtained when the received signal is added to the self-interference signal over the air, wherein the self-interference signal is known at the node;
   determining, by the node, a difference between consecutive preambles in the composite signal using an adaptive filter;
   determining, self-interference channel estimate using the composite signal based on the difference between consecutive preambles in the composite signal; and
   decoding the received signal by eliminating the self-interference signal from the received signal, based on the self-interference channel estimate.

2. The method of claim 1, wherein the self-interference estimates is determined using a filter which is adaptive.

3. The method of claim 1, wherein the preamble is a portion of the signal received at the node from the UE.

4. A node for decoding a received signal in a wireless communication system, the node comprising:
   a processor;
   a memory coupled to the processor;
   a transceiver coupled to the processor and the memory, configured to:
     receive, a signal from a first User Equipment (UE), wherein the received signal includes the encoded data and a symmetric preamble structure, wherein the symmetric preamble structure comprises a set of preambles, wherein in each preamble is identical to an at least one successive preamble in the symmetric preamble structure;
     obtain, a composite signal comprising a self-interference signal, and the received signal, wherein composite signal is obtained when the received signal is added to the self-interference signal over the air, wherein the self-interference signal is known at the node;

determine a difference between consecutive preambles in the composite signal using an adaptive filter;

determine self-interference channel estimates using the composite signal based on the difference between consecutive preambles in the composite signal; and decode the received signal by eliminating the self-interference signal from the received signal, based on the self-interference channel estimate.

5. The node of claim 4, wherein the self-interference estimates is determined using a filter which is adaptive.

6. The node of claim 4, wherein the preamble is a portion of the signal received at the node from the UE.

* * * * *